US012693526B2

(12) United States Patent
Lee et al.

(10) Patent No.: US 12,693,526 B2
(45) Date of Patent: Jul. 28, 2026

(54) LENS MODULE AND CAMERA MODULE

(71) Applicant: LG INNOTEK CO., LTD., Seoul (KR)

(72) Inventors: Joo Young Lee, Seoul (KR); Sang Ah Lee, Seoul (KR); Yong Seok Cho, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 647 days.

(21) Appl. No.: 17/925,196

(22) PCT Filed: May 10, 2021

(86) PCT No.: PCT/KR2021/005816
§ 371 (c)(1),
(2) Date: Nov. 14, 2022

(87) PCT Pub. No.: WO2021/230594
PCT Pub. Date: Nov. 18, 2021

(65) Prior Publication Data
US 2023/0194856 A1 Jun. 22, 2023

(30) Foreign Application Priority Data
May 12, 2020 (KR) ........................ 10-2020-0056654

(51) Int. Cl.
*G02B 27/00* (2006.01)
*G02B 13/00* (2006.01)

(52) U.S. Cl.
CPC ....... *G02B 27/0006* (2013.01); *G02B 13/001* (2013.01)

(58) Field of Classification Search
CPC .. G02B 27/0006; G02B 13/001; G02B 7/021; G02B 7/028; G02B 3/02; G03B 17/12
USPC ........................................... 359/512
See application file for complete search history.

(56) References Cited

U.S. PATENT DOCUMENTS

| | | | |
|---|---|---|---|
| 5,351,339 A | 10/1994 | Reuber et al. | |
| 10,241,240 B1 * | 3/2019 | Choi ........................ | G02B 3/14 |
| 2009/0212549 A1 | 8/2009 | Jones | |
| 2011/0126345 A1 | 6/2011 | Matsumoto et al. | |
| 2015/0241608 A1 | 8/2015 | Shian et al. | |
| 2017/0059808 A1 * | 3/2017 | Wippermann ......... | G02B 7/181 |

(Continued)

FOREIGN PATENT DOCUMENTS

| | | |
|---|---|---|
| CN | 105324699 A | 2/2016 |
| CN | 107690594 A | 2/2018 |

(Continued)

*Primary Examiner* — Bumsuk Won
*Assistant Examiner* — Rahman Abdur
(74) *Attorney, Agent, or Firm* — Birch, Stewart, Kolasch & Birch, LLP

(57) ABSTRACT

An embodiment of the present invention relates to a lens module comprising: a first lens which comprises a center portion including a curved surface and a periphery portion extending from the center portion; an electrode which is disposed on the first lens; and first and second conductive parts which are disposed on the electrode, wherein the first and second conductive parts include first and second surfaces opposite to each other with respect to the center portion therebetween, respectively, and the first and second surfaces are convex toward the center portion.

17 Claims, 8 Drawing Sheets

(56)　　　　　　References Cited

U.S. PATENT DOCUMENTS

| | | |
|---|---|---|
| 2018/0081187 A1 | 3/2018 | Huh et al. |
| 2019/0212549 A1 | 7/2019 | Choi et al. |
| 2019/0302450 A1 | 10/2019 | Lee et al. |

FOREIGN PATENT DOCUMENTS

| | | |
|---|---|---|
| CN | 109588061 A | 4/2019 |
| CN | 110326282 A | 10/2019 |
| JP | 2019-184999 A | 10/2019 |
| JP | 2020-60639 A | 4/2020 |
| KR | 10-2012-0047728 A | 5/2012 |
| KR | 10-2015-0051765 A | 5/2015 |
| KR | 10-2017-0041360 A | 4/2017 |
| KR | 10-2018-0032730 A | 4/2018 |
| KR | 10-2018-0060752 A | 6/2018 |
| KR | 10-2019-0133432 A | 12/2019 |
| WO | WO2019/225974 A1 | 11/2019 |

* cited by examiner (a)  (b)

LENS MODULE AND CAMERA MODULE

CROSS REFERENCE TO RELATED APPLICATIONS

This application is the National Phase of PCT International Application No. PCT/KR2021/005816, filed on May 10, 2021, which claims priority under 35 U.S.C. 119 (a) to Patent Application No. 10-2020-0056654, filed in the Republic of Korea on May 12, 2020, all of which are hereby expressly incorporated by reference into the present application.

TECHNICAL FIELD

The present embodiment relates to a lens module and a camera module.

BACKGROUND ART

Recently, ultra-small camera modules have been developed, and ultra-small camera modules are widely used in small electronic products such as smartphones, laptops, and game consoles.

With the popularization of automobiles, ultra-small cameras are widely used not only in small electronic products but also in vehicles. For example, a black box camera for vehicle protection or objective data of traffic accidents, a rear monitoring camera that allows the driver to monitor blind spots at the rear of the vehicle through the screen to ensure safety when the vehicle moves backward, a peripheral detection camera capable of monitoring the surroundings of the vehicle, and the like are provided.

The camera may include a lens, a lens holder accommodating the lens, an image sensor for converting an image of a subject collected in the lens into an electrical signal, and a printed circuit board on which the image sensor is mounted. The housing forming the outer shape of the camera has a structure in which the entire region thereof is sealed to prevent internal components from being contaminated from foreign substances including moisture.

Due to the characteristics of a vehicle that is placed outdoors, the temperatures inside and outside the vehicle form various distributions depending on the time. For example, in summer, the indoor temperature may be higher than the outdoor temperature, and in winter, the temperature may drop to below zero. Accordingly, condensation including frost may occur in the components including the lens and glass of the camera according to a sudden temperature change. For this reason, satisfactory recordings may not be obtained, or product failure may occur.

In particular, a vehicle camera used in an autonomous vehicle has a problem in that an image is distorted because fogging and icing are generated on a lens surface exposed to the outside due to a change in temperature, humidity, or the like. To solve this, a camera module heating the lens surface for de-fogging and de-icing is used.

The conventional camera module has a problem in that the current density is biased toward the periphery portion of the lens rather than the center portion of the lens due to the curvature of the lens.

In addition, there is a problem in that unnecessary current is consumed for de-fogging and de-icing of the lens center portion due to the bias of the current density toward the periphery portion.

DETAILED DESCRIPTION OF THE INVENTION

Technical Subject

The present embodiment is to provide a camera module that can remove frost and ice on the lens surface in a short time.

In addition, it is to provide a camera module capable of preventing distortion through de-fogging and de-icing.

In addition, it is to provide a camera module capable of preventing the occurrence of condensation including frost on the lens.

In addition, it is to provide a camera module capable of controlling the temperature of the lens by increasing the current density at a desired position.

In addition, it is to provide a camera module capable of minimizing the current used for de-fogging and de-icing of the lens and the time for de-fogging and de-icing.

Technical Solution

A lens module according to the present embodiment comprises: a first lens which comprises a center portion including a curved surface and a periphery portion being extended from the center portion; an electrode being disposed in the first lens; and a first conductive part and a second conductive part being disposed in the electrode, wherein the first conductive part and the second conductive part include a first surface and a second surface facing each other with respect to the center portion therebetween, respectively, and wherein the first surface and the second surface may be convex facing toward the center portion.

In addition, the first lens includes a boundary portion where the center portion and the periphery portion meet, wherein the curvature of the portion facing the first surface of the first conductive part of the boundary is different from the curvature of the first surface of the first conductive part, and wherein the curvature of the portion facing the second surface of the second conductive part of the boundary may be different from the curvature of the second surface of the second conductive part.

In addition, the first curvature of the first surface of the first conductive part may be different from the curvature of the second surface of the second conductive part.

In addition, the first lens includes a boundary portion where the center portion and the periphery portion meet, wherein the first surface of the first conductive part includes a first-first surface and a first-second surface, and wherein the shortest distance between the first-first surface of the first conductive part and the boundary portion of the first lens may be different from the shortest distance between the first-second surface of the first conductive part and the boundary portion.

In addition, the first conductive part may be bent in a direction different from a bending direction of a portion adjacent to the first conductive part among the boundary portions.

In addition, the first lens includes an outer edge of the periphery portion, wherein the first surface of the first conductive part includes a first-first surface and a first-second surface, and wherein the shortest distance between the first-first surface of the first conductive part and the outer edge of the first lens may be different from the shortest distance between the first-second surface of the first conductive part and the outer edge of the first lens.

In addition, the first lens includes: a boundary portion where the center portion and the periphery portion meet; and an outer edge of the periphery portion, wherein the first conductive part and the second conductive part may be disposed close to the boundary portion than the outer edge of the periphery portion of the first lens.

In addition, the first surface of the first conductive part includes: a first-first surface; and a first-second surface, wherein the second surface of the second conductive part includes a second-first surface being overlapped with the first-first surface of the first conductive part in a first direction perpendicular to the optical axis of the first lens, and a second-second surface being overlapped with the first-second surface of the first conductive part in the first direction, and wherein the shortest distance on the surface of the electrode connecting the first-first surface of the first conductive part and the second-first surface of the second conductive part may be the same as the shortest distance from the surface of the electrode connecting the first-second surface of the first conductive part and the second-second surface of the second conductive part.

In addition, the first-first surface of the first conductive part and the first-second surface of the first conductive part may be spaced apart from each other in a second direction perpendicular to the optical axis and the first direction.

In addition, the first lens may include a boundary portion where the center portion and the periphery portion meet, wherein a curvature of each of the first conductive part and the second conductive part may be different from a curvature of the boundary portion.

In addition, the first conductive part may be symmetrical with respect to an optical axis of the second conductive part and the first lens.

In addition, the first lens may be a lens being disposed at an uppermost end.

In addition, the electrode may include a transparent electrode.

In addition, the first conductive part and the second conductive part may be fixed to the electrode by a conductive adhesive.

The camera module according to the present embodiment may comprise: a board; a holder being disposed on the board; a lens module of claim 1 being disposed in the holder; a lens being disposed inside the holder and being disposed below the first lens of the lens module; an image sensor being disposed on the board and being disposed at a position corresponding to the lens; and a flexible printed circuit board having one end being disposed in the board and the other end being disposed in the holder The lens module according to the present embodiment comprises: a first lens including a center portion including a curved surface and a periphery portion being extended from the center portion; an electrode being disposed in the first lens; and a first conductive part and a second conductive part being disposed in the electrode, wherein at least one surface of an upper surface or a lower surface of the periphery portion includes a flat portion, the first conductive part and the second conductive part are being disposed in the flat portion, the first conductive part and the second conductive part are being disposed to face each other with the center portion therebetween, the first lens includes a boundary portion where the center portion and the periphery portion meet, the first conductive part and the second conductive part include a shape symmetrical to each other with respect to the optical axis of the center portion, and the shortest straight line distance between the center portion of the first conductive part and the center portion of the second conductive part may be smaller than the shortest straight line distance between the end portion of the first conductive part and the end portion of the second conductive part.

In addition, the first lens includes a boundary portion where the center portion and the periphery portion meet, the first conductive part includes a first surface facing the second conductive part, the first conductive part includes a first-first surface and a first-second surface being disposed in the first surface of the first conductive part and spaced apart from each other, and the shortest linear distance between the first-first surface of the first conductive part and the boundary portion of the first lens may be different from the shortest linear distance between the first-second surface of the first conductive part and the boundary portion of the first lens.

In addition, the first conductive part may be bent in a direction different from a bending direction of a portion adjacent to the first conductive part among the boundary portions of the first lens.

The lens module according to the present embodiment comprises: a first lens including a center portion including a curved surface and a periphery portion being extended from the center portion; an electrode being disposed in the first lens; and a first conductive part and a second conductive part being disposed in the electrode, wherein the first conductive part and the second conductive part are being disposed to face each other with the center portion therebetween, the first lens includes a boundary portion where the center portion and the periphery portion meet, and the shortest conduction path between the end portion of the first conductive part and the end portion of the second conductive part may be the same as the shortest conduction path between the center portion of the first conductive part and the center portion of the second conductive part.

In addition, the shortest conduction path may be a distance being extended along the surface of the electrode.

Advantageous Effects

Through the present embodiment, it is possible to remove frost and ice on the lens surface in a short time.

In addition, distortion phenomenon can be prevented through de-fogging, and de-icing.

In addition, it is possible to prevent the occurrence of condensation including frost on the lens.

In addition, the temperature of the lens can be controlled by increasing the current density at the desired location.

In addition, it is possible to minimize the current used for de-fogging and de-icing of the lens, and the time for de-fogging and de-icing can be minimized.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under)", the meaning of not only an upward direction but also a downward direction based on one component may be included.

Hereinafter, a configuration of a lens module according to an embodiment of the present invention will be described with reference to the drawings.

Figure 1:
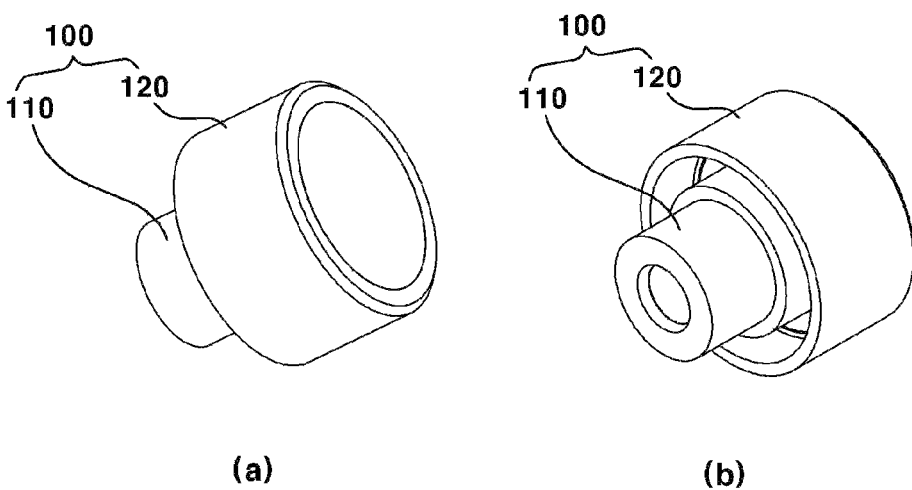
FIG. 1 is a perspective view of a lens module according to an embodiment of the present invention.
Figure 2:
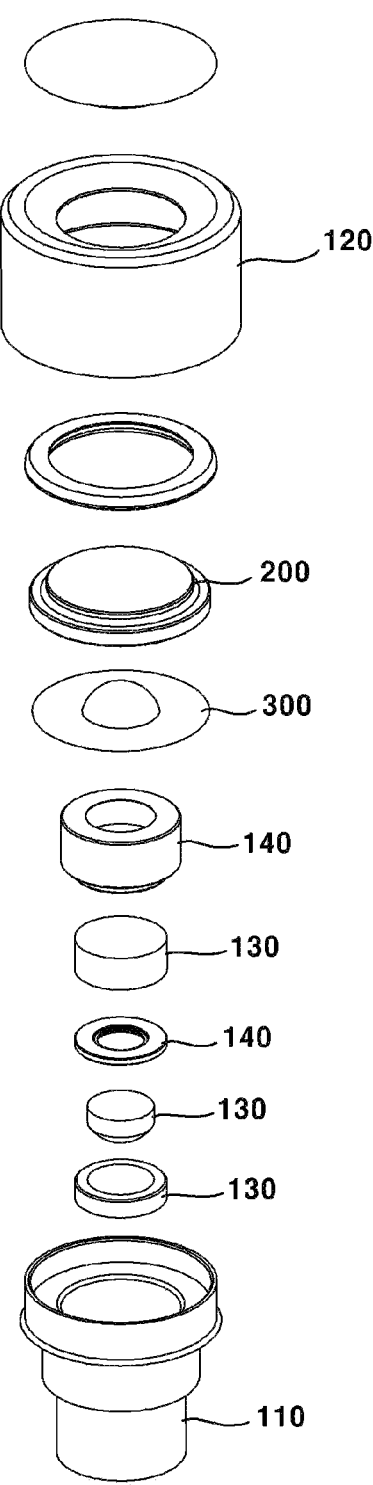
FIG. 2 is an exploded perspective view of FIG. 1.
Figure 3:
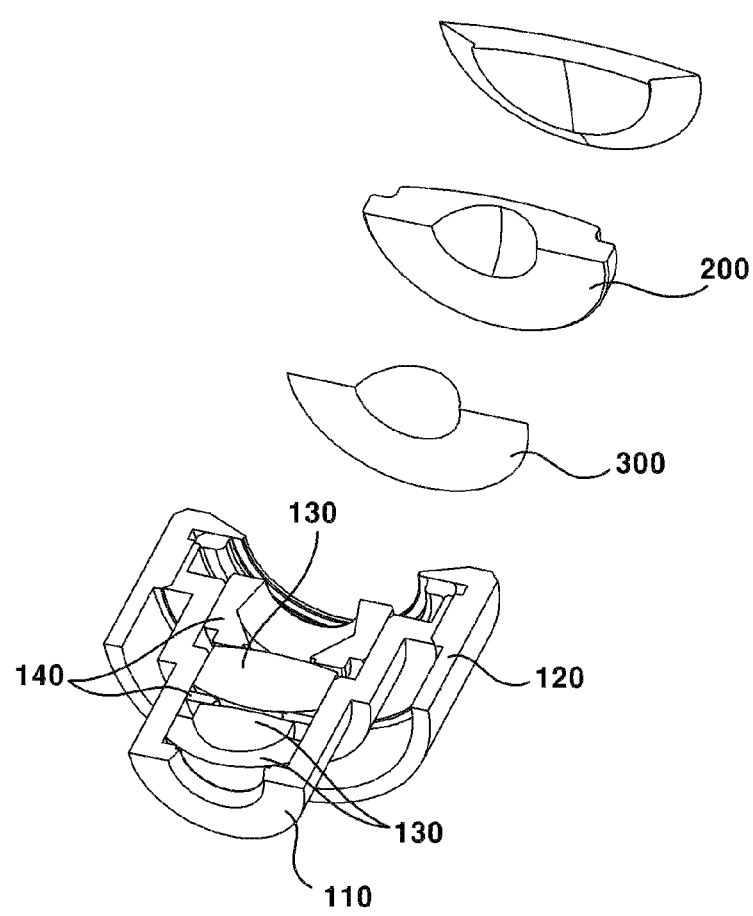
FIGS. 3 and 4 are cross-sectional views of FIG. 1.
Figure 4:
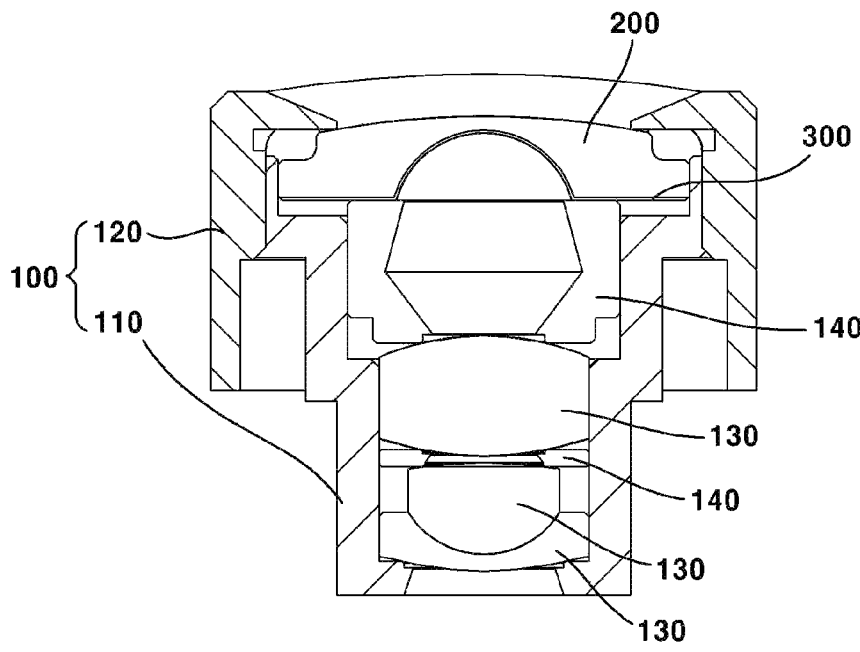
Figure 5:
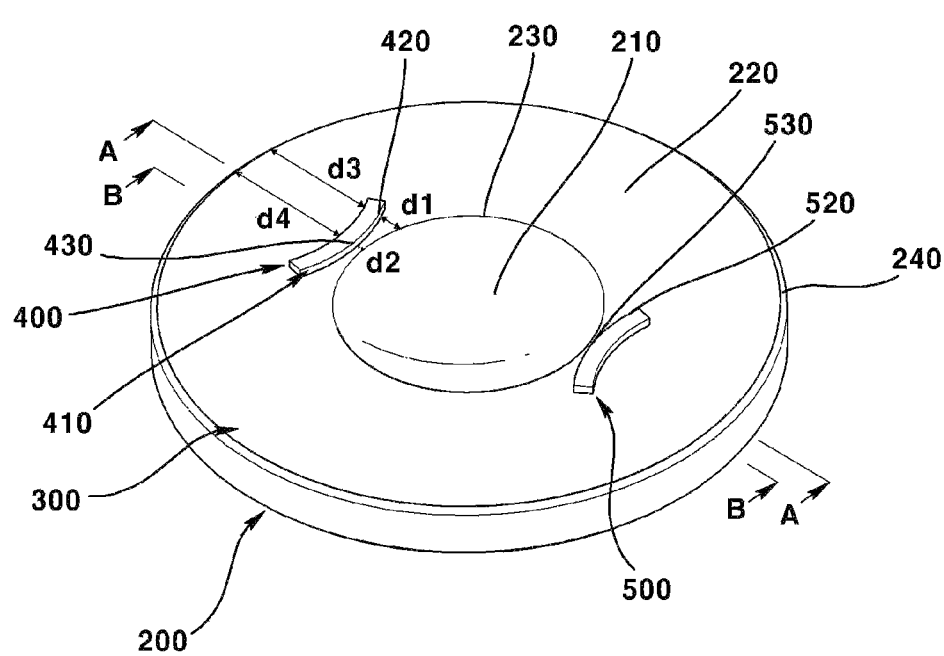
FIG. 5 is a perspective view of a partial configuration of a lens module according to an embodiment of the present invention.
Figure 6:
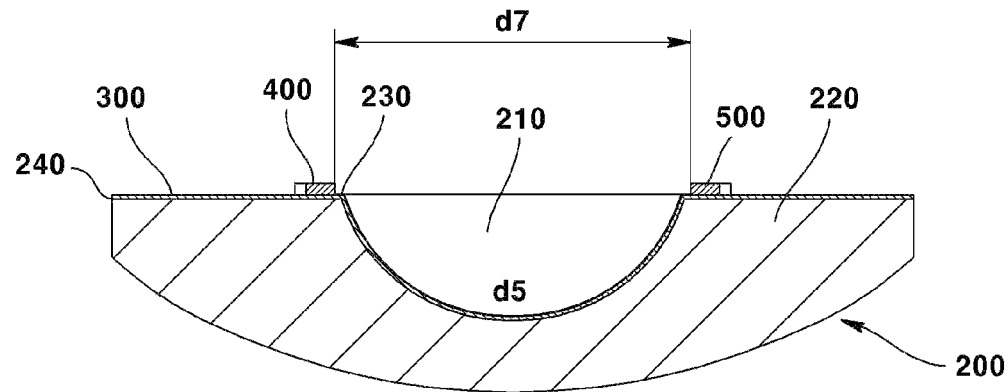
FIG. 6 is a cross-sectional view taken along line A-A of FIG. 5.
Figure 7:
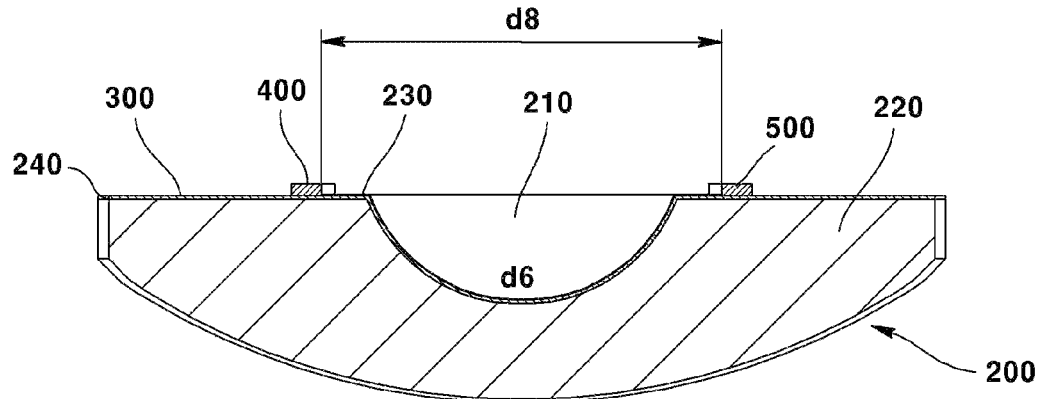
FIG. 7 is a cross-sectional view taken along line B-B of FIG. 5.
Figure 8:
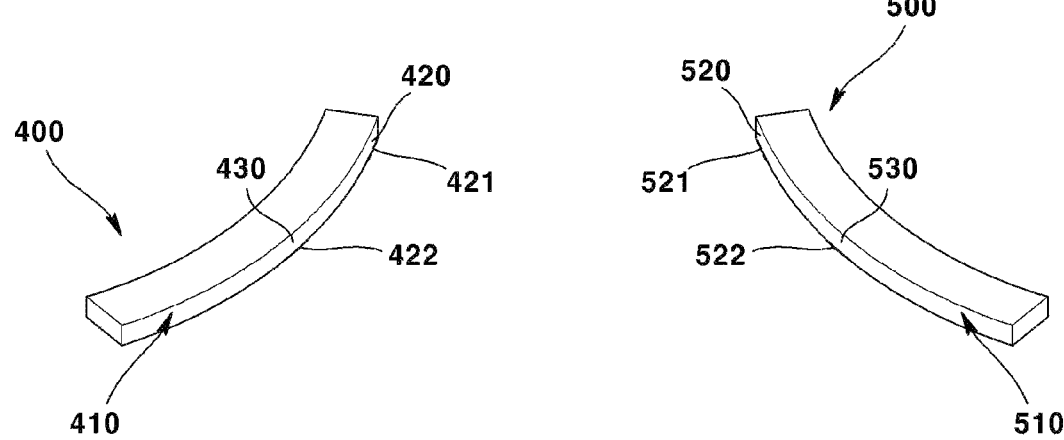
FIG. 8 is a perspective view of a first conductive part and a second conductive part of a lens module according to an embodiment of the present invention.
Figure 9:
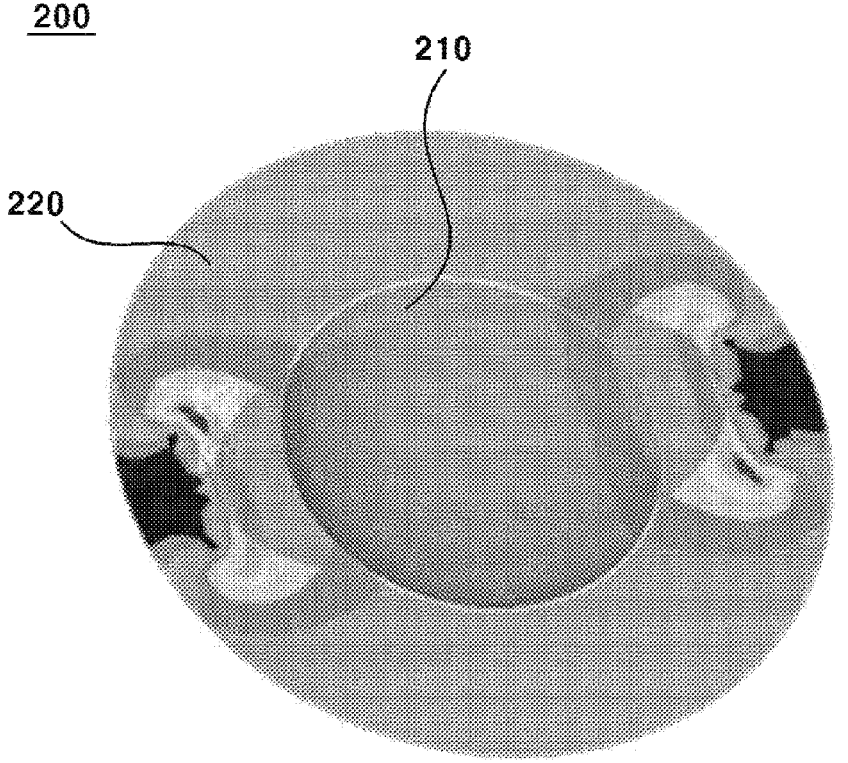
FIG. 9 is a diagram illustrating a current density of a lens module according to an embodiment of the present invention.
Figure 10:
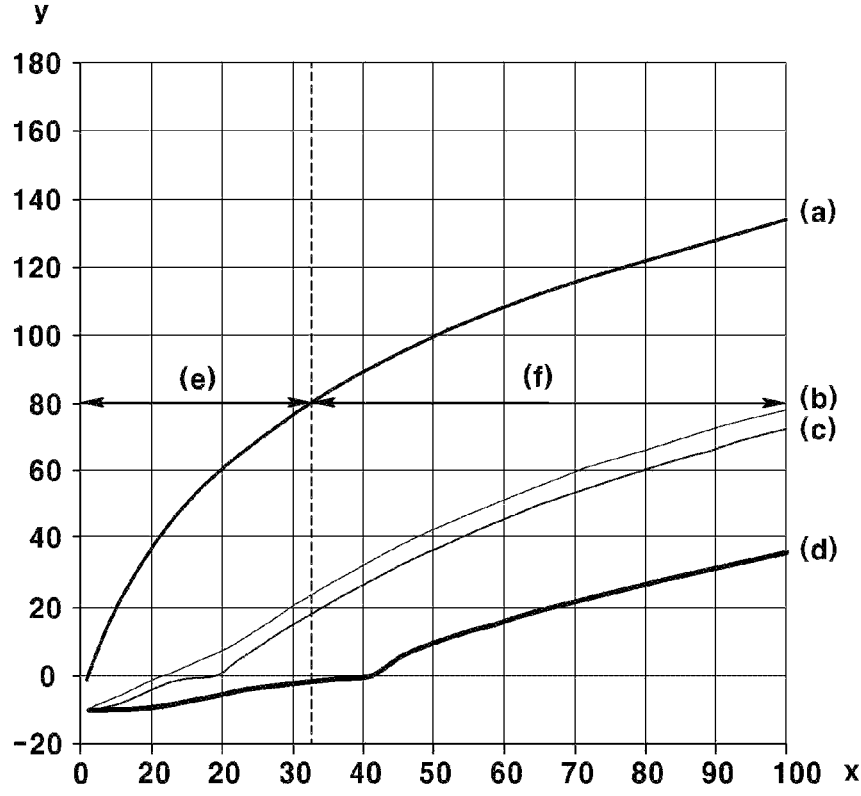
FIG. 10 is a graph showing a de-icing section according to the prior art.
Figure 11:
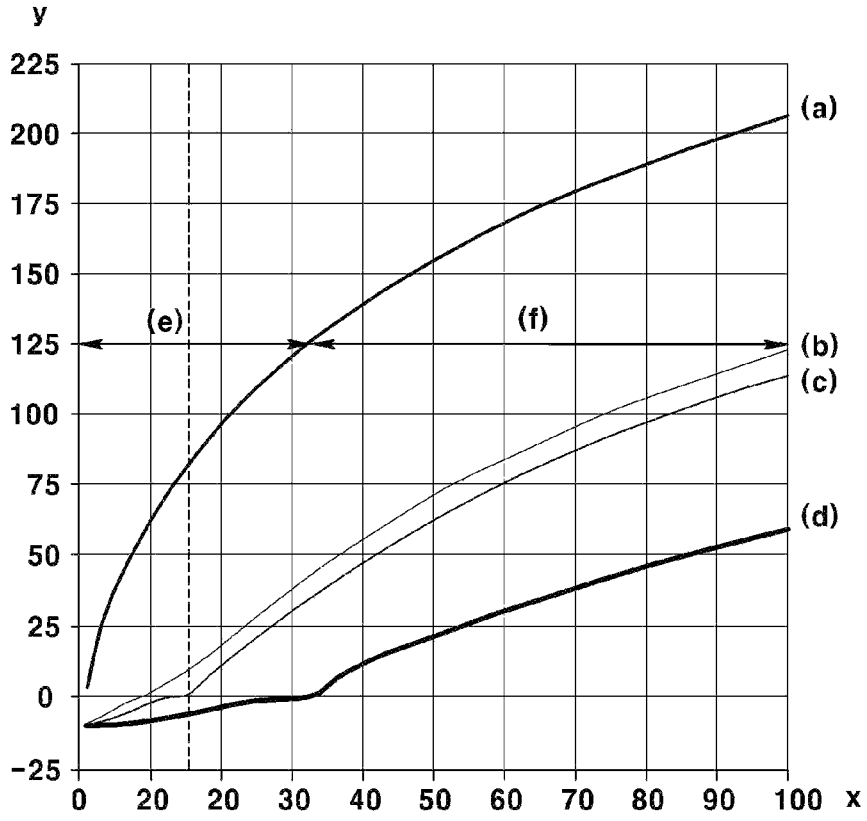
FIG. 11 is a graph illustrating a de-icing section according to a lens module according to an embodiment of the present invention.

FIG. 1 is a perspective view of a lens module according to an embodiment of the present invention; FIG. 2 is an exploded perspective view of FIG. 1; FIGS. 3 and 4 are cross-sectional views of FIG. 1; FIG. 5 is a perspective view of a partial configuration of a lens module according to an embodiment of the present invention; FIG. 6 is a cross-sectional view taken along line A-A of FIG. 5; FIG. 7 is a cross-sectional view taken along line B-B of FIG. 5; FIG. 8 is a perspective view of a first conductive part and a second conductive part of a lens module according to an embodiment of the present invention; FIG. 9 is a diagram illustrating a current density of a lens module according to an embodiment of the present invention; FIG. 10 is a graph showing a de-icing section according to the prior art; and FIG. 11 is a graph illustrating a de-icing section according to a lens module according to an embodiment of the present invention.

The lens module according to an embodiment of the present invention may include a lens 130. The lens 130 may be disposed inside the holder 100. The lens 130 may be disposed inside the first holder 110. The lens 130 may be disposed inside the second holder 120. The lens 130 may be disposed between the spacers 140. The lens 130 may include a plurality of lenses 130. The plurality of lenses 130 may be spaced apart by a spacer 140.

The lens 130 may include a first lens 200. The first lens 200 may be a lens being disposed at the uppermost end among the plurality of lenses 130. The first lens 200 may be a lens being exposed to the outside. The first lens 200 may be disposed closest to the subject among the plurality of lenses 130. The first lens 200 may include a first surface facing the object side and a second surface being disposed at an opposite side of the first surface.

The first lens 200 may include a center portion 210 and a periphery portion 220. The center portion 210 may include a curved surface. The center portion 210 may be disposed at the center of the first lens 200. The center portion 210 may have a curvature. The curvature of the center portion 210 may be greater than the curvature of the periphery portion 220. The center portion 210 may be concavely formed in the second surface of the first lens 200. The center portion 210 may be formed to be concave in the optical axis from the second surface of the first lens 200. The center portion 210 may be formed to be concave toward the subject from the second surface of the first lens 200. However, the present invention is not limited thereto, and the center portion 210 may be convexly formed in the second surface of the first lens 200.

The periphery portion 220 may be disposed outside the center portion 210. The periphery portion 220 may be extended from the center portion 210. The periphery portion 220 may be extended outwardly from the center portion 210. The periphery portion 220 may be a flange portion. The periphery portion 220 may include a flat surface. The periphery portion 220 may be formed to be flat. At this time, a flat portion of the periphery portion 200 may be referred to as a flat portion. The periphery portion 220 may have a curvature. The curvature of the periphery portion 220 may be smaller than the curvature of the center portion 210. The periphery portion 220 may have a curvature of '0'. The periphery portion 220 may be formed to be flat in the second surface of the first lens 200. The periphery portion 220 may have a curvature in the second surface of the first lens 200. The curvature of the periphery portion 220 in the second surface of the first lens 200 may be '0'.

The first lens 200 may include a boundary portion 230. The boundary portion 230 may be formed at a location where the center portion 210 and the periphery portion 220 meet. The first lens 200 may include an outer edge 240 of the periphery portion 220. The boundary portion 230 may have a curvature. The curvature of the boundary portion 230 may be different from the curvature of the first surface 410 of the first conductive part 400. The curvature of the boundary portion 230 may be different from the curvature of the second surface 510 of the second conductive part 500. The radius of curvature of the boundary portion 230 may be located in a region between the first surface 410 of the first conductive part 400 and the second surface 510 of the second conductive part 500. A radius of curvature of the boundary portion 230 may be different from a radius of curvature of the first surface 410 of the first conductive part 400. A radius of curvature of the boundary portion 230 may be different from a radius of curvature of the second surface 510 of the second conductive part 500. An area adjacent to the first conductive part 400 of the boundary portion 230 and the first surface 410 of the first conductive part 400 may include a biconcave shape. A region adjacent to the second conductive part 400 of the boundary portion 230 and the second surface 510 of the second conductive part 500 may include a biconcave shape. More specifically, a region adjacent to the first conductive part 400 among the boundary portion 230 and the first surface 410 of the first conductive part 400 may have a ')(' shape. A region adjacent to the second conductive part 400 among the boundary portion 230 and the second surface 510 of the second conductive part 500 may have a ')(' shape. The center of curvature of the radius of curvature of the boundary portion 230 may be spaced apart from the center of curvature of the radius of curvature of the first conductive part 400. The center of curvature of the radius of curvature of the boundary portion 230 may be spaced apart from the center of curvature of the radius of curvature of the second conductive part 500.

The lens module according to an embodiment of the present invention may include an electrode 300. The electrode 300 may be disposed in the first lens 200. The electrode 300 may be disposed on the first lens 200. The electrode 300 may be disposed on the center portion 210 of the first lens 200. The electrode 300 may be disposed on the periphery portion 220 of the first lens 200. The thickness of the electrode 300 in an optical axis direction may be smaller than the thickness of the first lens 200 in an optical axis direction. The electrode 300 may be disposed on the second surface of the first lens 200. However, the present invention is not limited thereto, and the electrode 300 may be disposed on the first surface of the first lens 200.

The electrode 300 may include a transparent electrode. The transparent electrode may include a transparent conductive oxide. The transparent conductive oxide may include indium tin oxide (ITO). The transparent conductive oxide may include indium zinc oxide (IZO). The transparent electrode may include a metal mesh. The metal mesh may include any one among gold (Au), silver (Ag), copper (Cu), aluminum (Al), and titanium (Ti). The transparent electrode may include a nano wire.

The electrode 300 may be a conductive coating surface. The electrode 300 may be a conductive coating layer. The electrode 300 may be formed of a transparent material. The electrode 300 may be a transparent conductive film having electrical conductivity. The electrode 300 may be an indium tin oxide (ITO) coated surface. The electrode 300 may be an indium tin oxide (ITO) coating layer. The electrode 300 may heat the surface of the first lens 200 when current is supplied. The electrode 300 may heat the second surface of the first lens 200 when current is supplied. The electrode 300 may heat the center portion 210 and the periphery portion 220 of the first lens 200 when current is supplied.

The lens module according to an embodiment of the present invention may include a first conductive part 400. The first conductive part 400 may be disposed in the electrode 300. The first conductive part 400 may be disposed on the electrode 300. The first conductive part 400 may be disposed on the first lens 200. The first conductive part 400 may be disposed on the second surface of the first lens 200. The first conductive part 400 may be disposed to face each other with the second conductive part 500 and the center portion 210 interposed therebetween. The first conductive part 400 may include a first surface 410 facing the second conductive part 500.

The first conductive part 400 may include a first region 420. The first region 420 may be overlapped with the third region 520 of the second conductive part 500 in a first direction perpendicular to the optical axis of the lens 130. The first region 420 may be spaced apart from the second region 430 in a second direction perpendicular to the optical axis and a first direction. The first region 420 may be disposed in the first surface 410 of the first conductive part 400. The first conductive part 400 may include a second region 430. The second region 430 may be overlapped with the fourth region 530 of the second conductive part 500 in a first direction. The second region 430 may be spaced apart from the first region 420 in a second direction perpendicular to the optical axis and a first direction. The second region 430 may be disposed in the first surface 410 of the first conductive part 400.

The shortest distance d1 between the first region 420 of the first conductive part 400 and the boundary portion 230 of the first lens 200 may be different from the shortest distance d2 between the second region 430 of the first conductive part 400 and the boundary portion 230 of the first lens 200. The shortest distance d1 between the first region 420 of the first conductive part 400 and the boundary portion 230 of the first lens 200 may be larger than the shortest distance d2 between the second region 430 of the first conductive part 400 and the boundary portion 230 of the first lens 200.

The shortest distance d3 between the first region 420 of the first conductive part 400 and the outer edge 240 of the first lens 200 may be different from the shortest distance d4 between the second region 430 of the first conductive part 400 and the outer edge 240 of the first lens 200. The shortest distance d3 between the first region 420 of the first conductive part 400 and the outer edge 240 of the first lens 200 may be smaller than the shortest distance d4 between the second region 430 of the first conductive part 400 and the outer edge 240 of the first lens 200.

The first conductive part 400 may include a first surface 440. The first surface 440 may face the boundary portion 230. The first surface 440 may be convex toward the boundary portion 230.

The first surface 440 may include a first-first surface 421. The first-first surface 421 may be disposed in the first region 420 of the first conductive part 400. The first-first surface 421 may be overlapped with the second-first surface 521 of the second conductive part 500 in a first direction. The first surface 440 may include a first-second surface 422. The first-second surface 422 may be disposed in the second region 430 of the first conductive part 400. The first-second surface 422 may be overlapped with the second-second surface 522 of the second conductive part 500 in a first direction. The first-first surface 421 and the first-second surface 422 may be spaced apart from each other in a second direction perpendicular to the optical axis and a first direction. The first-second surface 422 may be disposed closer to the boundary portion 230 than the first-first surface 421.

The shortest distance d1 between the first-first surface 421 and the boundary portion 230 of the first lens 200 may be different from the shortest distance d2 between the first-second surface 422 and the boundary portion 230 of the first conductive part 400. The shortest distance d1 between the first-first surface 421 and the boundary portion 230 of the first lens 200 may be larger than the shortest distance d2 between the first-second surface 422 and the boundary portion 230 of the first conductive part 400.

The shortest distance d3 between the first-first surface 421 and the outer edge 240 may be different from the shortest distance d4 between the first-first surface 422 and the outer edge 240. The shortest distance d3 between the first-first surface 421 and the outer edge 240 may be smaller than the shortest distance d4 between the first-first surface 422 and the outer edge 240.

The first conductive part 400 may be bent in a direction different from the bending direction of the portion adjacent to the first conductive part 400 among the boundary portion 230. The first conductive part 400 may be bent in a direction opposite to the bending direction of the portion adjacent to the first conductive part 400 among the boundary portion 230. The curvature of the first conductive part 400 may be different from the curvature of the boundary portion 230. The curvature of the first surface 410 of the first conductive part 400 may be different from the curvature of the boundary portion 230.

The curvature of the first surface 410 of the first conductive part 400 may be different from the curvature of the second surface 510 of the second conductive part 500. A sign of curvature of the first surface 410 of the first conductive part 400 may have a sign opposite to a sign of curvature of the second surface 510 of the second conductive part 500. The bending direction of the first surface 410 of the first conductive part 400 may be different from the bending direction of the second surface 510 of the second conductive part 500. The bending direction of the first surface 410 of the first conductive part 400 may be bent in a direction opposite to the bending direction of the second surface 510 of the second conductive part 500. A radius of curvature of the first surface 410 of the first conductive part 400 may be disposed at an opposite side of the direction facing toward the boundary portion 230. The center of curvature of the radius of curvature of the first surface 410 of the first conductive part 400 may be disposed at an opposite side of the direction facing toward the boundary portion 230. The center of curvature of the radius of curvature of the first surface 410 of the first conductive part 400 may be spaced apart from the center of curvature of the radius of curvature of the second surface 510 of the second conductive part 500.

The first conductive part 400 may be symmetrical with respect to the optical axis of the second conductive part 500 and the first lens 200. The first conductive part 400 may be disposed closer to the boundary portion 230 of the first lens 200 than the outer edge 240 of the periphery portion 220 of the first lens 200.

The lens module according to an embodiment of the present invention may include a second conductive part 500. The second conductive part 500 may be disposed in the electrode 300. The second conductive part 500 may be disposed on the electrode 300. The second conductive part 500 may be disposed on the first lens 200. The second conductive part 500 may be disposed on the second surface of the first lens 200. The second conductive part 500 may be disposed to face each other with the first conductive part 400 and the center portion 210 interposed therebetween. The second conductive part 500 may include a second surface 510 facing the first conductive part 400.

The second conductive part 500 may include a third region 520. The third region 520 may be overlapped with the first region 420 of the first conductive part 400 in a first direction perpendicular to the optical axis of the lens 130. The third region 520 may be spaced apart from the fourth region 530 in a second direction perpendicular to the optical axis and a first direction. The third region 520 may be disposed in the second surface 510 of the second conductive part 500. The second conductive part 500 may include a fourth region 530. The fourth region 530 may be overlapped with the second region 430 of the first conductive part 400 in a first direction. The fourth region 530 may be spaced apart from the third region 520 in a second direction perpendicular to the optical axis and a first direction. The third region 520 and the fourth region 530 may be disposed in the second surface 510 of the second conductive part 500.

The shortest distance between the third region 520 of the second conductive part 500 and the boundary portion 230 of the first lens 200 may be different from the shortest distance between the fourth region 430 of the second conductive part 500 and the boundary portion 230 of the first lens 200. The shortest distance between the third region 520 of the second conductive part 500 and the boundary portion 230 of the first lens 200 may be larger than the shortest distance between the fourth region 530 of the second conductive part 500 and the boundary portion 230 of the first lens 200. At this time, the shortest distance may mean a distance in a first direction perpendicular to the optical axis of the first lens 200.

The shortest distance between the third region 520 of the second conductive part 500 and the boundary portion 230 of the first lens 200 may be different from the shortest distance between the fourth region 430 of the second conductive part 500 and the boundary portion 230 of the first lens 200. The shortest distance between the third region 520 of the second conductive part 500 and the boundary portion 230 of the first lens 200 may be larger than the shortest distance between the fourth region 530 of the second conductive part 500 and the boundary portion 230 of the first lens 200. At this time, the shortest distance may mean a distance in a first direction perpendicular to the optical axis of the first lens 200.

The second conductive part 500 may include a second surface 540. The second surface 540 may be disposed in the second surface 510 of the second conductive part 500. The second surface 540 may face the boundary portion 230. The second surface 540 may be convex facing toward the boundary portion 230.

The second surface 540 may include a second-first surface 521. The second-first surface 521 may be disposed in the third region 520 of the second conductive part 500. The second-first surface 521 may be overlapped with the first-first surface 421 of the first conductive part 400 in a first direction. The second surface 540 may include a second-second surface 522. The second-second surface 522 may be disposed in the fourth region 530 of the second conductive part 500. The second-second surface 522 may be overlapped with the first-second surface 422 of the first conductive part 400 in a first direction. The second-first surface 521 and the second-second surface 522 may be spaced apart from each other in a second direction perpendicular to the optical axis and a first direction. The second-second surface 522 may be disposed closer to the boundary portion 230 than the second-first surface 521.

The shortest distance between the second-first surface 521 and the boundary portion 230 of the first lens 200 may be different from the shortest distance between the second-second surface 522 and the boundary portion 230 of the second conductive part 500. The shortest distance between the second-first surface 521 and the boundary portion 230 of the first lens 200 may be larger than the shortest distance between the second-second surface 522 and the boundary portion 230 of the second conductive part 500. At this time, the shortest distance may mean a distance in a first direction perpendicular to the optical axis of the first lens 200.

The shortest distance between the second-first surface 521 and the outer edge 240 may be different from the shortest distance between second-first surface 522 and outer edge 240. The shortest distance between the second-first surface 521 and the outer edge 240 may be smaller than the shortest distance between the second-first surface 422 and the outer edge 240. At this time, the shortest distance may mean a distance in a first direction perpendicular to the optical axis of the first lens 200.

The second conductive part 500 may be bent in a direction different from the bent direction of the adjacent part with the second conductive part 500 among the boundary portion 230. The second conductive part 500 may be bent in a direction opposite to the bent direction of the adjacent part with the second conductive part 500 among the boundary portion 230. The curvature of the second conductive part 500 may be different from the curvature of the boundary portion 230. A curvature of the second surface 510 of the second conductive part 500 may be different from the curvature of the boundary portion 230.

The curvature of the second surface 510 of the second conductive part 500 may be different from the curvature of the first surface 410 of the first conductive part 400. The sign of curvature of the second surface 510 of the second conductive part 500 may have a sign opposite to the sign of curvature of the first surface 410 of the first conductive part 400. The bending direction of the second surface 510 of the second conductive part 500 may be different from the bending direction of the first surface 410 of the first conductive part 400. The bending direction of the second surface 510 of the second conductive part 500 may be bent in a direction opposite to the bending direction of the first surface 410 of the first conductive part 400. The radius of curvature of the second surface 510 of the second conductive part 500 may be disposed at an opposite side of the direction facing toward the boundary portion 230. The center of curvature of the radius of curvature of the second surface 510 of the second conductive part 500 may be disposed at an opposite side of the direction facing toward the boundary portion 230. The center of curvature of the radius of curvature of the second surface 510 of the second conductive part 500 may be spaced apart from the center of the radius of curvature of the first surface 410 of the first conductive part 400. The second surface 510 of the second conductive part 500 and the first surface 410 of the first conductive part 400 may have a biconcave shape. The second surface 510 of the second conductive part 500 and the first surface 410 of the first conductive part 400 may be formed to be in a ")(" shape.

The second conductive part 500 may be symmetrical with respect to the optical axis of the first conductive part 400 and the first lens 200. The second conductive part 500 may be symmetrical with respect to the optical axis of the first conductive part 400 and the first lens 200 and a second direction perpendicular to the first direction. The second conductive part 500 may be disposed closer to the boundary portion 230 of the first lens 200 than the outer edge 240 of the periphery portion 220 of the first lens 200.

Referring to FIGS. 6 and 7, the shortest distance being extended along the surface of the electrode 300 between the first conductive part 400 and the second conductive part 500 may be the same in all regions. The shortest conduction path d5 between the end portion of the first conductive part 400 and the end portion of the second conductive part 500 may be the same as the shortest conduction path d6 between the center portion of the first conductive part 400 and the center portion of the second conductive part 500. At this time, the shortest conduction path may mean a shortest path passing through at least a portion of the periphery portion 220 of the first lens 200 and the region of the center portion 210 of the first lens 200. The shortest distance d5 from the surface of the electrode 300 connecting the first region 420 of the first conductive part 400 and the third region 520 of the second conductive part 500 may be the same as the shortest distance d6 from the surface of the electrode 300 connecting the second region 430 of the first conductive part 400 and the fourth region 530 of the second conductive part 500. shortest distance d5 being extended along the surface of the electrode 300 connecting the first region 420 of the first conductive part 400 and the third region 520 of the second conductive part 500 may be the same as the shortest distance d6 being extended along the surface of the electrode 300 connecting the second region 430 of the first conductive part 400 and the fourth region 530 of the second conductive part 500. At this time, the shortest distances d5 and d6 may be the sum of the shortest distances of a region of the electrode 300 being disposed on the periphery portion 220 of the lens 200 and of the electrode 300 region being disposed on the center portion 210 of the lens 200. At this time, the shortest distance may mean a distance in a first direction perpendicular to the optical axis of the first lens 200.

The shortest straight line distance d8 between the center portion of the first conductive part 400 and the center portion of the second conductive part 500 may be smaller than the shortest straight line distance d7 between the end portion of the first conductive part 400 and the end portion of the second conductive part 500. At this time, the shortest linear distances d7 and d8 may not be lengths being extended along the surface of the electrode 300. That is, it may mean the shortest distance among virtual straight lines connecting the center portion of the first conductive part 400 and the center portion of the second conductive part 500. In addition, it may mean the shortest distance among virtual straight lines connecting the end portion of the first conductive part 400 and the end portion of the second conductive part 500. The shortest straight line distance d7 connecting the first region 420 of the first conductive part 400 and the third region 520 of the second conductive part 500 may be larger than the shortest straight line distance d8 connecting the second region 430 of the first conductive part 400 and the fourth region 530 of the second conductive part 500.

The shortest distance d5 from the surface of the electrode 300 connecting the first-first surface 421 of the first conductive part 400 and the second-first surface 521 of the second conductive part 500 may be the same as the shortest distance d6 from the surface of the electrode 300 connecting the first-second surface 421 of the first conductive part 400 and the second-second surface 522 of the second conductive part 500. At this time, the shortest distances d5 and d6 may be the sum of the distance of a region of the electrode 300 being disposed on the periphery portion 220 of the lens 200 and of the shortest distance of the electrode 300 region being disposed on the center portion 210 of the lens 200. At this time, the shortest distance may mean a distance in a first direction perpendicular to the optical axis of the first lens 200.

The shortest distance on the surface of the electrode 300 between the first conductive part 400 and the second conductive part 500 may be a region having the lowest resistance. At this time, the current may flow biasedly toward the shortest distance on the surface of the electrode 300 between the first conductive part 400 and the second conductive part 500 having the lowest resistance. Referring to FIG. 9, it can be seen that the current is concentrated in the center portion 210 of the first lens 200. In this case, the temperature of the center portion 210 of the first lens 200 may rise in a shorter time than the temperature of the periphery portion 220 of the first lens 200. Through this, the removal time of fogging and icing generated in the center portion 210 can be shortened.

The x-axis of FIGS. 10 and 11, represents time (s) and the y-axis represents temperature (° C.), (a) is a curve showing the temperature per hour of the first lens, (b) is a curve showing the temperature per hour of the second surface of the center portion of the first lens, (c) is a curve showing the temperature per hour of the first surface of the center portion of the first lens, (d) is a curve showing the temperature per hour of the periphery portion of the first lens, (e) represents the section in which de-icing is possible, and (f) shows the section in which de-icing is impossible. Referring to FIG. 10, the conventional lens module has a de-icing section up to 20 seconds, while referring to FIG. 11, the lens module of the present invention has a de-icing section up to 15 seconds, which can be seen that de-fogging and de-icing are possible in a faster time than the conventional lens module.

The first conductive part 400 and the second conductive part 500 may be fixed to the electrode 300. The first conductive part 400 and the second conductive part 500 may be fixed to the electrode 300 by an adhesive. The first conductive part 400 and the second conductive part 500 may be fixed to the electrode 300 by a conductive adhesive. The first conductive part 400 and the second conductive part 500 may be fixed to the electrode 300 by anisotropic conductive film (ACF) bonding. In this case, a separate adhesive may not be required. In this case, the current supplied to the first conductive part 400 may flow only in one direction by ACF bonding. The current supplied to the first conductive part 400 may be transmitted only in a forward direction from the first conductive part 400 facing toward the electrode 300 by ACF bonding. Current may not be transferred in the reverse direction from the electrode 300 to the first conductive part 400 by ACF bonding. The current supplied to the first conductive part 400 may be supplied to the electrode 300 by ACF bonding, and the current supplied to the electrode 300 may be transferred to the second conductive part 500. Current may not be transferred in the reverse direction from the second conductive part 400 facing toward the electrode 300 by ACF bonding.

The first conductive part 400 and the second conductive part 500 may include a bottom surface facing the electrode 300 and an upper surface being disposed at an opposite side of the bottom surface. The first conductive part 400 may not include a portion being protruded from the upper surface of the first conductive part 400. The second conductive part 400 may not include a portion being protruded from the upper surface of the second conductive part 400. The first conductive part 400 and the second conductive part 500 may be connected to a flexible printed circuit board, respectively. In this case, the flexible circuit board may be more protruded than the upper surfaces of the first conductive part 400 and the second conductive part 500.

Hereinafter, a configuration of a lens module according to another embodiment of the present invention will be described in detail with reference to the drawings.

Figure 12:
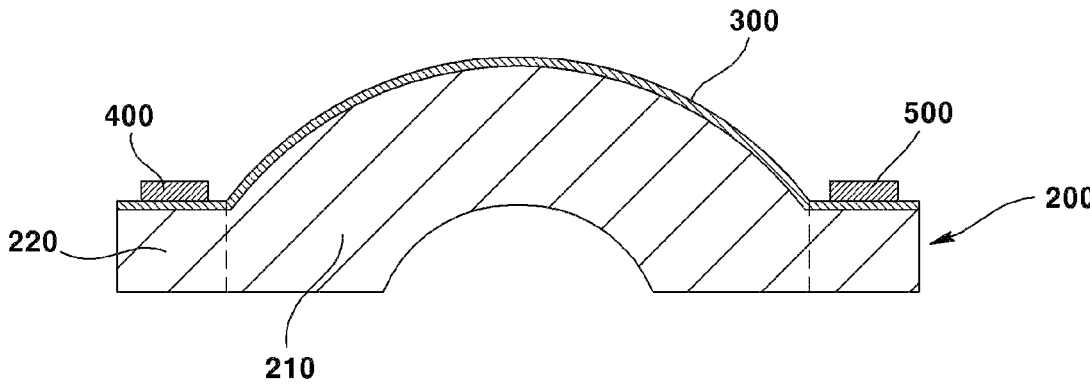
FIG. 12 is a cross-sectional view of a lens module according to another embodiment of the present invention.

FIG. 12 is a cross-sectional view of a lens module according to another embodiment of the present invention.

A lens module according to another embodiment of the present invention may be understood as the same as the detailed configuration of the lens module according to an embodiment of the present invention except for the shape of the first lens 200 of the lens module according to an embodiment of the present invention. In more detail, in the first lens 130 of the lens module according to an embodiment of the present invention, the first surface is convex on an optical axis and the second surface is formed to be concave in an optical axis, whereas the first lens 200 of the lens module according to another embodiment may have a first surface convex in an optical axis and a second surface may be formed to be concave in an optical axis.

A lens module according to another embodiment may include a first lens 200. The first lens 200 may be a lens being disposed at the uppermost end among the plurality of lenses 130. The first lens 200 may be a lens being exposed to the outside. The first lens 200 may be disposed closest to the subject among the plurality of lenses 130. The first lens 200 may include a first surface facing the object side and a second surface being disposed at an opposite side of the first surface. At this time, the first surface of the first lens 200 being exposed to the outside is formed to be convex at least in part, and the second surface of the first lens 200 not being exposed to the outside may be formed to be concave at least in part.

The first lens 200 may include a center portion 210 and a periphery portion 220. The center portion 210 may include a curved surface. The center portion 210 may be disposed at the center of the first lens 200. The center portion 210 may have a curvature. The curvature of the center portion 210 may be greater than the curvature of the periphery portion 220. The center portion 210 may be concavely formed in an optical axis in the second surface of the first lens 200. The center portion 210 may be formed to be concave in an optical axis from the second surface of the first lens 200. The center portion 210 may be formed to be concave facing toward the subject from the second surface of the first lens 200.

The periphery portion 220 may be disposed outside the center portion 210. The periphery portion 220 may be extended from the center portion 210. The periphery portion 220 may be extended outwardly from the center portion 210. The periphery portion 220 may be a flange portion. The periphery portion 220 may include a flat surface. The periphery portion 220 may be formed to be flat. At this time, a flat portion of the periphery portion 200 may be referred to as a flat portion.

The periphery portion 220 of the lens module according to another embodiment may include an upper surface being formed in the first surface of the first lens 200 and a lower surface being formed in the second surface of the first lens 200. At least one of the upper surface and the lower surface of the periphery portion 220 may include a flat portion formed to be flat. At this time, the first conductive part 400 and the second conductive part 500 may be disposed in the flat portion of the periphery portion 220.

The camera module according to an embodiment of the present invention may include a vehicle camera module being mounted on a vehicle. The camera module may include a vehicle front camera module being mounted on the front of the vehicle. The camera module may include a vehicle rear camera module being mounted on the rear of the vehicle. The camera module may include a vehicle camera module being mounted on the side of the vehicle.

The camera module according to the present embodiment may include a holder 100. A lens 130 may be disposed inside the holder 100. A plurality of lenses 130 may be disposed inside the holder 100. A spacer 140 may be disposed inside the holder 100. A plurality of spacers 140 may be disposed inside the holder 100.

The holder may include a hole. The hole may be formed penetrating through the upper and lower portions of the holder 100. A lens 130 may be disposed in the hole. A plurality of lenses 130 may be disposed in the hole. A spacer 140 may be disposed in the hole. A plurality of spacers 140 may be disposed in the hole.

The holder 100 may include a first holder 110. The first holder 110 may be disposed below the second holder 120 which will be described later. At least a portion of the first holder 110 may be disposed inside the second holder 120. The first holder 110 may be coupled to the second holder 120. At least a portion of the first holder 110 may be overlapped with the first holder 110 in a direction perpendicular to the optical axis. The first holder 110 may include a hole. The hole of the first holder 110 may be formed penetrating through the upper surface and the lower surface of the first holder 110. The lens 130 may be disposed inside the hole of the first holder 110. A plurality of lenses 130 may be disposed inside the hole of the first holder 110. A spacer 140 may be disposed inside the hole of the first holder 110. A plurality of spacers 140 may be disposed inside the hole of the first holder 110. The spacer 140 may be disposed between the plurality of lenses 130. The spacer 140 may space the plurality of lenses 130 apart. The holes of the first holder 110 may include regions having different diameters. The diameter of the hole of the first holder 110 may vary depending on the diameter of the lens 130. A diameter of a portion in which the first lens 200 being disposed at an uppermost end among the plurality of lenses 130 in the hole of the first holder 110 is disposed may be larger than the diameter of another portion of the first holder 110.

The holder 100 may include a second holder 120. The second holder 120 may be disposed above the first holder 110. The second holder 120 may be coupled to the first holder 110. The first holder 110 may be disposed inside the second holder 120. The second holder 120 may include an upper plate and a side plate being extended from the upper plate. A lower surface of the upper plate of the second holder 120 may be in contact with the first lens 200. At least a portion of the upper plate of the second holder 120 may be in contact with the first lens 200. The upper plate of the second holder 120 may include a hole. The diameter of the hole of the upper plate of the second holder 120 may be smaller than the diameter of the first lens 200. At least a portion of the upper plate of the second holder 120 may be protruded inward than a portion where the first lens 200 of the first holder 110 is disposed. The side plate of the second holder 120 may be overlapped with the first holder 110 in a direction perpendicular to the optical axis.

The camera module according to an embodiment of the present invention may include a board (not shown). The board may include a printed circuit board (PCB). The board may include a flexible printed circuit board (FPCB). The camera module may include an additional board provided separately from the board. The additional board may include a flexible printed circuit board (FPCB). One end of the additional board may be disposed in the board and the other end may be disposed in the holder 100. The additional board may connect the holder 100 and the board. The additional board can electrically connect the lens module and the board. Through this, power generated from the board can be applied to the lens module.

The camera module according to an embodiment of the present invention may include an image sensor (not shown). The image sensor may be disposed in the upper surface of the board. The image sensor can be mounted on the board. For example, the image sensor may be coupled to the board by surface mounting technology (SMT). As another example, the image sensor may be coupled to the board by a flip chip technology. The image sensor may be overlapped with the lens 130 in an optical axis direction.

According to the lens module according to the present invention, it is possible to remove frost and ice generated on the surface of the first lens 200 in a short time. In addition, the temperature of the first lens 200 may be controlled by increasing the current density at a desired position. In addition, it is possible to minimize the current used for de-fogging and de-icing of the surface of the first lens 200 and the time for de-fogging and de-icing.

Although the embodiment of the present invention has been described above with reference to the accompanying drawings, those of ordinary skill in the art to which the present invention belongs will understand that the present invention may be embodied in other specific forms without changing the technical spirit or essential features thereof. Therefore, it should be understood that the embodiments described above are illustrative in all respects and not restrictive.

The invention claimed is:

1. A lens module comprising:

a first lens comprising a center portion including a curved surface and a periphery portion extended from the center portion;

an electrode disposed on the first lens; and a first conductive part and a second conductive part disposed in the electrode, wherein the first conductive part includes a first surface and the second conductive part includes a second surface, the first surface and the second surface facing each other with respect to the center portion therebetween respectively, wherein the first surface overlaps with the second surface in a direction perpendicular to an optical axis of the first lens, and wherein the first surface and the second surface are convex facing toward the center portion, wherein the first surface of the first conductive part comprises a first-first surface and a first-second surface, wherein the second surface of the second conductive part comprises a second-first surface overlapped with the first-first surface of the first conductive part in a first direction perpendicular to an optical axis of the first lens, and a second-second surface overlapped with the first-second surface of the first conductive part in the first direction, wherein the shortest distance on a surface of the electrode connecting the first-first surface of the first conductive part and the second-first surface of the second conductive part is the same as the shortest distance from the surface of the electrode connecting the first-second surface of the first conductive part and the second-second surface of the second conductive part, wherein the first-first surface of the first conductive part is disposed on a periphery portion of the first surface of the first conductive part and the first-second surface of the first conductive part is disposed on a center portion of the first surface of the first conductive part, and wherein the first-first surface of the first surface of the first conductive part and the first-second surface of the first surface of the first conductive part are spaced apart from each other in a second direction perpendicular to the optical axis and the first direction.

2. The lens module according to claim 1, wherein the first lens further comprises a boundary portion where the center portion and the periphery portion meet, wherein a curvature of a portion of the boundary portion facing the first surface of the first conductive part is different from a curvature of the first surface of the first conductive part, and wherein a curvature of a portion of the boundary facing the second surface of the second conductive part is different from a curvature of the second surface of the second conductive part.

3. The lens module according to claim 1, wherein a first curvature of the first surface of the first conductive part is different from a curvature of the second surface of the second conductive part.

4. The lens module according to claim 1, wherein the first lens further comprises a boundary portion where the center portion and the periphery portion meet, and, wherein the shortest distance between the first-first surface of the first conductive part and the boundary portion of the first lens is different from the shortest distance between the first-second surface of the first conductive part and the boundary portion.

5. The lens module according to claim 4, wherein the first conductive part is bent in a direction different from a bending direction of a portion of the boundary portion adjacent to the first conductive part.

6. The lens module according to claim 1, wherein the first lens further comprises an outer edge of the periphery portion, wherein the first surface of the first conductive part comprises a first-first surface and a first-second surface, and wherein the shortest distance between the first-first surface of the first conductive part and the outer edge of the first lens is different from the shortest distance between the first-second surface of the first conductive part and the outer edge of the first lens.

7. The lens module according to claim 1, wherein the first lens further comprises a boundary portion where the center portion and the periphery portion meet and an outer edge of the periphery portion, and wherein the first conductive part and the second conductive part are disposed close to the boundary portion than the outer edge of the periphery portion of the first lens.

8. The lens module according to claim 1, wherein the first lens further comprises a boundary portion where the center portion and the periphery portion meet, wherein a curvature of each of the first conductive part and the second conductive part are different from a curvature of the boundary portion.

9. The lens module according to claim 1, wherein the first conductive part is symmetrical to the second conductive part with respect to an optical axis of the first lens.

10. The lens module according to claim 1, wherein the first lens is a lens disposed at an uppermost end.

11. The lens module according to claim 1, wherein the electrode comprises a transparent electrode.

12. The lens module according to claim 1, wherein the first conductive part and the second conductive part are fixed to the electrode by a conductive adhesive.

13. A camera module comprising:
a board;
a holder disposed on the board;
a lens module of claim 1 disposed in the holder;
a lens disposed inside the holder and disposed below the first lens of the lens module;
an image sensor disposed on the board and disposed at a position corresponding to the lens; and
a flexible printed circuit board having one end disposed in the board and the other end disposed in the holder.

14. A lens module comprising:
a first lens comprising a center portion including a curved surface and a periphery portion extended from the center portion;
an electrode disposed on the first lens; and
a first conductive part and a second conductive part disposed in the electrode,
wherein at least one surface of an upper surface or a lower surface of the periphery portion comprises a flat portion,
wherein the first conductive part and the second conductive part are disposed in the flat portion,
wherein the first conductive part and the second conductive part are disposed to face each other with the center portion therebetween,
wherein the first lens comprises a boundary portion where the center portion and the periphery portion meet,
wherein the first conductive part and the second conductive part comprise a shape symmetrical to each other with respect to an optical axis of the center portion,
wherein the shortest straight line distance between the center portion of the first conductive part and the center portion of the second conductive part is smaller than the shortest straight line distance between the end portion of the first conductive part and the end portion of the second conductive part,
wherein the first conductive part includes a first surface and the second conductive part includes a second surface, the first surface and the second surface facing each other with respect to the center portion therebetween respectively,
wherein the first surface overlaps with the second surface in a direction perpendicular to an optical axis of the first lens, and
wherein the first surface and the second surface are convex facing toward the center portion,
wherein the first surface of the first conductive part comprises a first-first surface and a first-second surface,
wherein the second surface of the second conductive part comprises a second-first surface overlapped with the first-first surface of the first conductive part in a first direction perpendicular to an optical axis of the first lens, and a second-second surface overlapped with the first-second surface of the first conductive part in the first direction,
wherein the shortest distance on a surface of the electrode connecting the first-first surface of the first conductive part and the second-first surface of the second conductive part is the same as the shortest distance from the surface of the electrode connecting the first-second surface of the first conductive part and the second-second surface of the second conductive part,
wherein the first-first surface of the first conductive part is disposed on a periphery portion of the first surface of the first conductive part and the first-second surface of the first conductive part is disposed on a center portion of the first surface of the first conductive part, and wherein the first-first surface of the first surface of the first conductive part and the first-second surface of the first surface of the first conductive part are spaced apart from each other in a second direction perpendicular to the optical axis and the first direction.

15. The lens module according to claim 14, wherein the shortest linear distance between the first-first surface of the first conductive part and the boundary portion of the first lens is different from the shortest linear distance between the first-second surface of the first conductive part and the boundary portion of the first lens.

16. The lens module according to claim 14, wherein the first conductive part is bent in a direction different from a bending direction of a portion of the boundary portion adjacent to the first conductive part.

17. The lens module according to claim 14, wherein the first conductive part and the second conductive part are fixed to the electrode by a conductive adhesive.

* * * * *